(12) United States Patent
Kuan (10) Patent No.: US 9,625,090 B2
(45) Date of Patent: *Apr. 18, 2017

(54) MOUNTING DEVICE FOR MULTIPLE SCREENS

(71) Applicant: HON HAI PRECISION INDUSTRY CO., LTD., New Taipei (TW)

(72) Inventor: Chang-Ming Kuan, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 40 days.

This patent is subject to a terminal disclaimer.

(21) Appl. No.: 14/512,910

(22) Filed: Oct. 13, 2014

(65) Prior Publication Data

US 2015/0305503 A1 Oct. 29, 2015

(30) Foreign Application Priority Data

Apr. 23, 2014 (TW) .............................. 103114607 A (51) Int. Cl.
*A47B 96/06* (2006.01)
*F16M 13/02* (2006.01)
*F16M 11/08* (2006.01)
*F16M 11/18* (2006.01)

(52) U.S. Cl.
CPC .......... *F16M 13/022* (2013.01); *F16M 11/08* (2013.01); *F16M 11/18* (2013.01); *F16M 13/02* (2013.01)

(58) Field of Classification Search
CPC .... F16M 11/04; F16M 11/10; F16M 11/2092; F16M 11/2014; F16M 2200/061; F16M 13/02

USPC ......... 248/274.1, 276.1, 278.1, 282.1, 279.1, 248/122.1, 917, 918, 920, 921; 361/679.01, 679.02, 679.06, 825, 807

See application file for complete search history.

(56) References Cited

U.S. PATENT DOCUMENTS

| | | | |
|---|---|---|---|
| RE36,978 E * | 12/2000 | Moscovitch | F16M 11/14 248/122.1 |
| 6,554,238 B1 * | 4/2003 | Hibberd | A47B 81/061 248/278.1 |
| 7,529,083 B2 * | 5/2009 | Jeong | F16M 11/105 248/917 |
| 8,245,990 B2 * | 8/2012 | Huang | F16M 11/10 248/276.1 |

(Continued)

FOREIGN PATENT DOCUMENTS

| | | |
|---|---|---|
| CN | 201281210 Y | 7/2009 |
| CN | 202074200 U | 12/2011 |

(Continued)

*Primary Examiner* — Todd M Epps
(74) *Attorney, Agent, or Firm* — Steven M. Reiss (57) ABSTRACT

A mounting device for multiple screens includes a first fixing member, a second fixing member, and a third fixing member. The first fixing member and the second fixing member are coupled on the two opposite sides of the third fixing member. The third fixing member is fixed on an object. The screens are mounted on the first, the second, and the third fixing members. When the first fixing member is rotated with respect to the third fixing member, the second fixing member is simultaneously driven by the first fixing member to rotate with respect to the third fixing member.

14 Claims, 10 Drawing Sheets

(56) References Cited

U.S. PATENT DOCUMENTS

| | | | | |
|---|---|---|---|---|
| 8,282,052 | B2* | 10/2012 | Huang | F16M 11/045 248/125.1 |
| 9,004,430 | B2* | 4/2015 | Conner | F16M 11/08 248/277.1 |
| 9,089,216 | B2* | 7/2015 | Liu | F16M 11/10 |
| 2016/0058183 | A1* | 3/2016 | Kuan | F16M 1/00 211/26 |

FOREIGN PATENT DOCUMENTS

| | | |
|---|---|---|
| CN | 202171108 U | 3/2012 |
| CN | 102494332 A | 6/2012 |
| CN | 203384602 U | 1/2014 |
| CN | 203463889 U | 3/2014 |
| JP | 2002-295792 A | 10/2002 |
| TW | M323552 | 12/2007 |

\* cited by examiner

MOUNTING DEVICE FOR MULTIPLE SCREENS

FIELD

The present disclosure relates to mounting devices, and more particularly to a mounting device for multiple screens.

BACKGROUND

A video conferment always needs a big screen that is formed by a plurality of small screens. Therefore, a mounting device is needed to couple the small screens together to form the big screen, and hang the big screen on a wall.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a mounting device for multiple screens.

Figure 1:
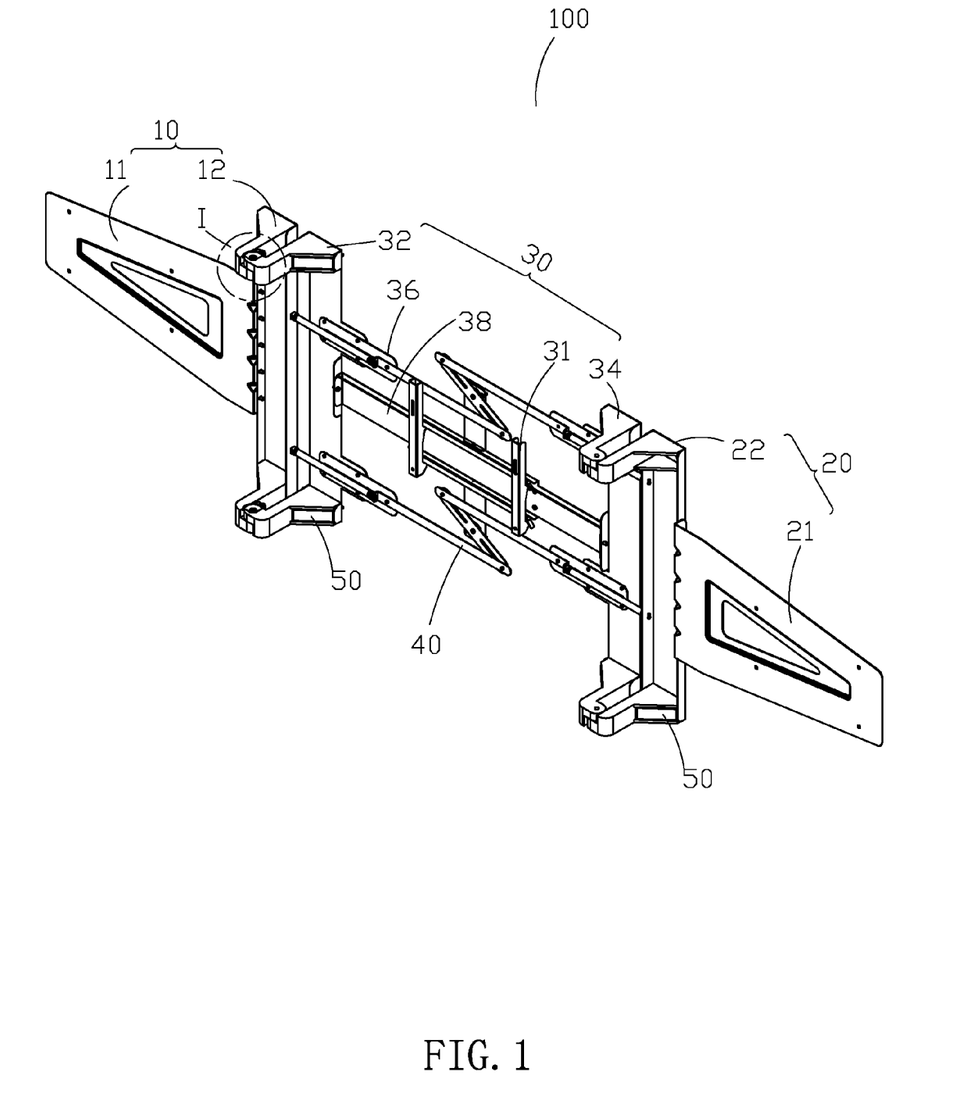
FIG. 1 is an isometric view of a mounting device for multiple screens with a first fixing member, a second fixing member, a third fixing member and a linking assembly, in accordance with an embodiment.
Figure 2:
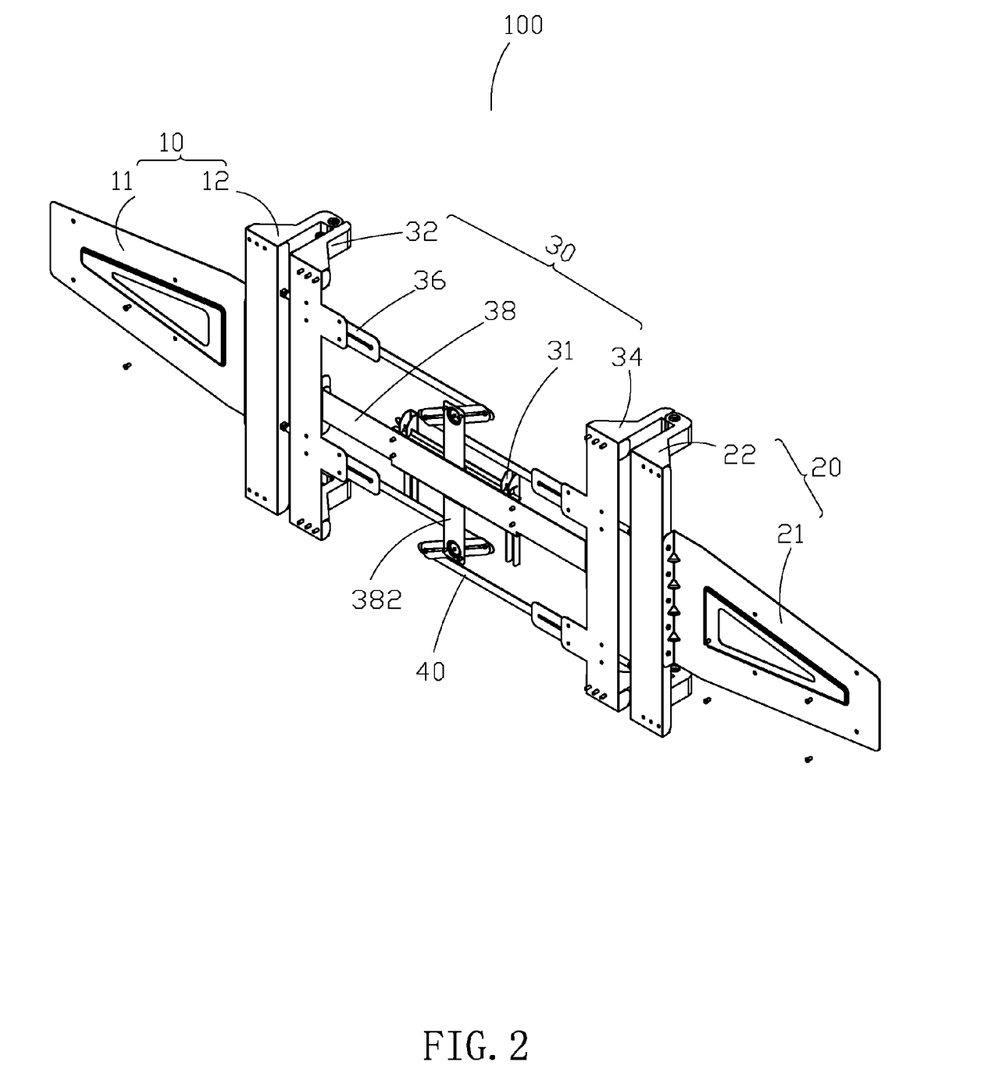
FIG. 2 is an isometric view of the mounting device of FIG. 1 viewed from a different angle.
Figure 9:
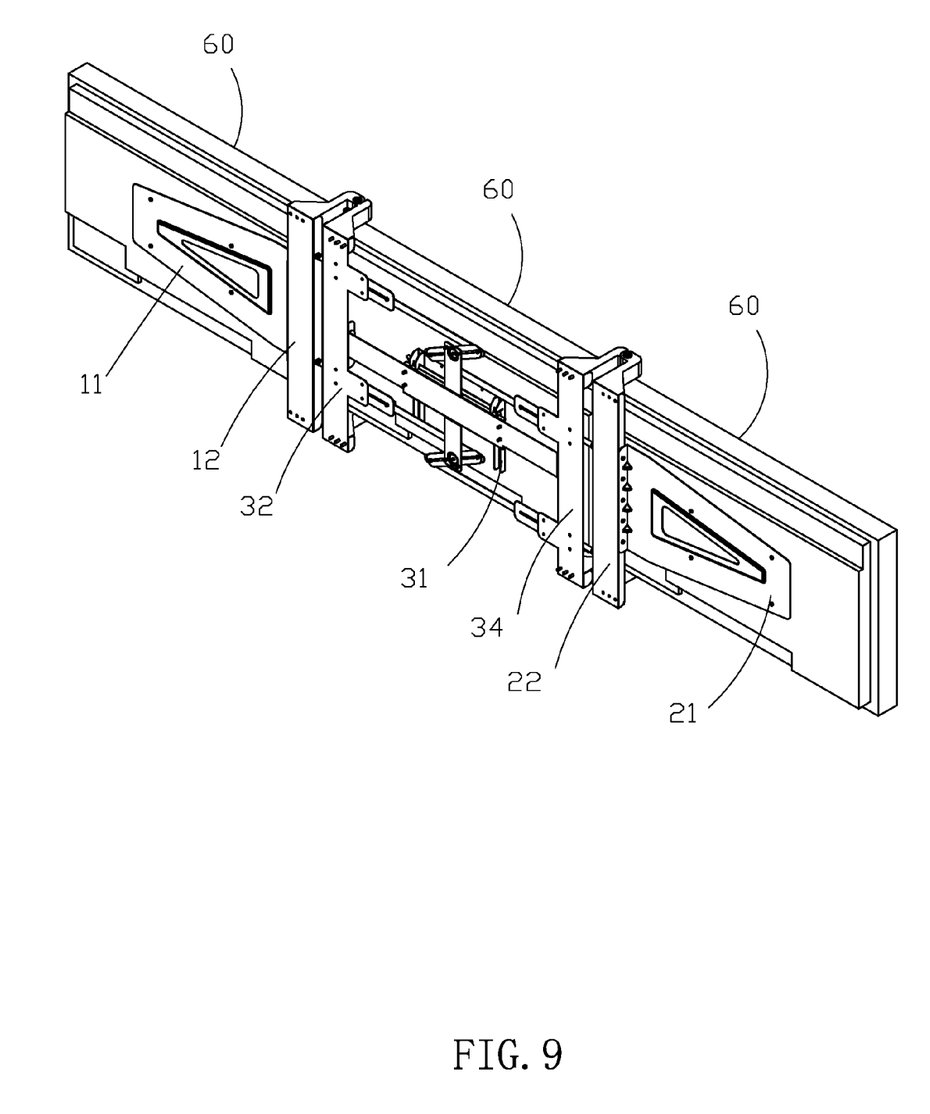
FIG. 9 is an isometric view of the mounting device of FIG. 2 with multiple screens in a first state.

FIGS. 1 and 2 illustrate a mounting device for multiple screens 100. The mounting device 100 includes a first fixing member 10, a second fixing member 20, a third fixing member 30, and a linking assembly 40. The first fixing member 10 and the second fixing member 20 relative pivot to the third fixing member 30, respectively. The third fixing member 30 can be fixed on a wall. The linking assembly 40 communicates with the first fixing member 10, the second fixing member 20, and the third fixing member 30 respectively to enable the first fixing member 10 and the second fixing member 20 to rotate relative to the third fixing member 30. Each of the first fixing member 10, the second fixing member 20, and the third fixing member 30 fixes one screen 60 (shown in FIG. 9).

Figure 3:
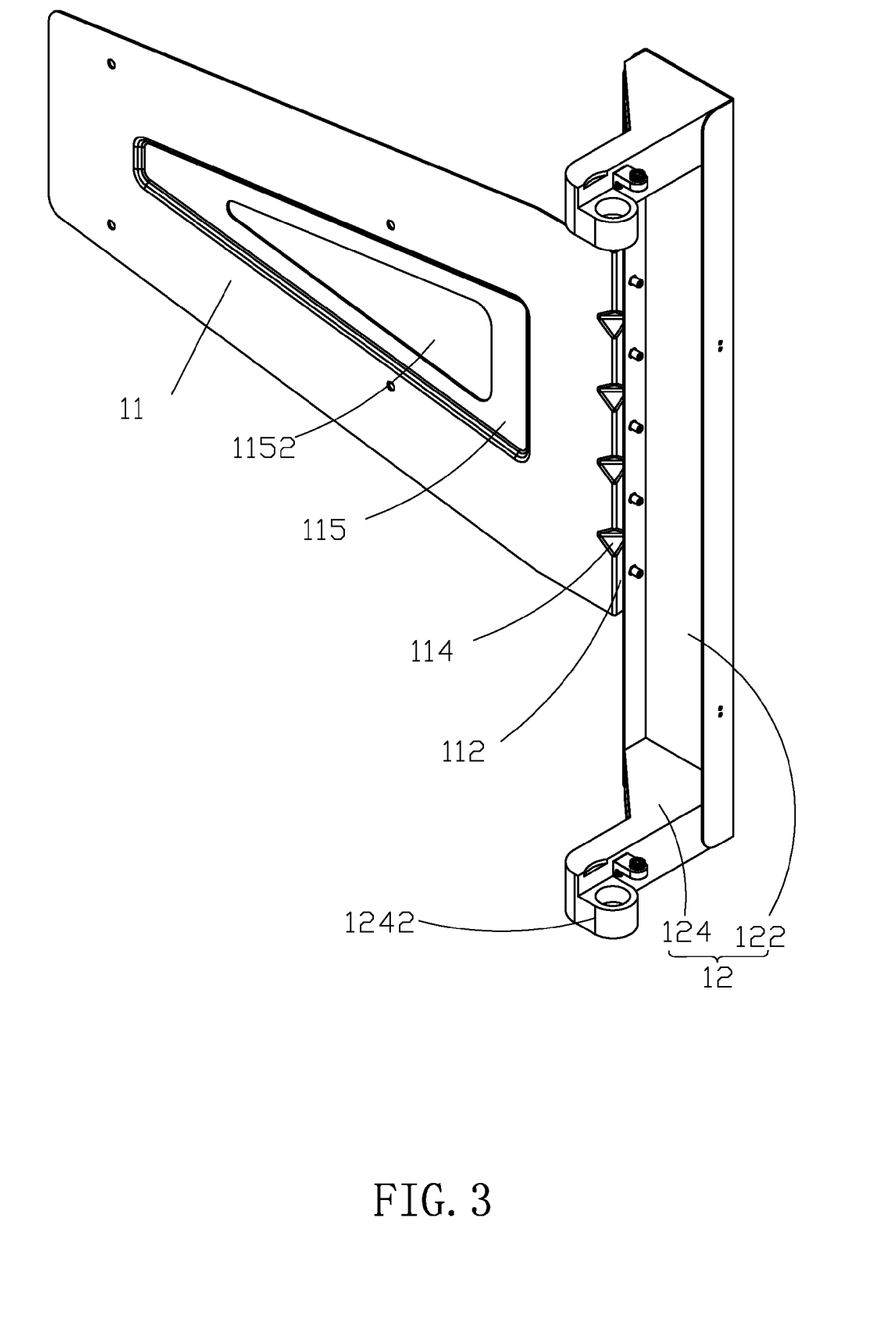
FIG. 3 is an isometric view of the first fixing member in FIG. 1.
Figure 7:
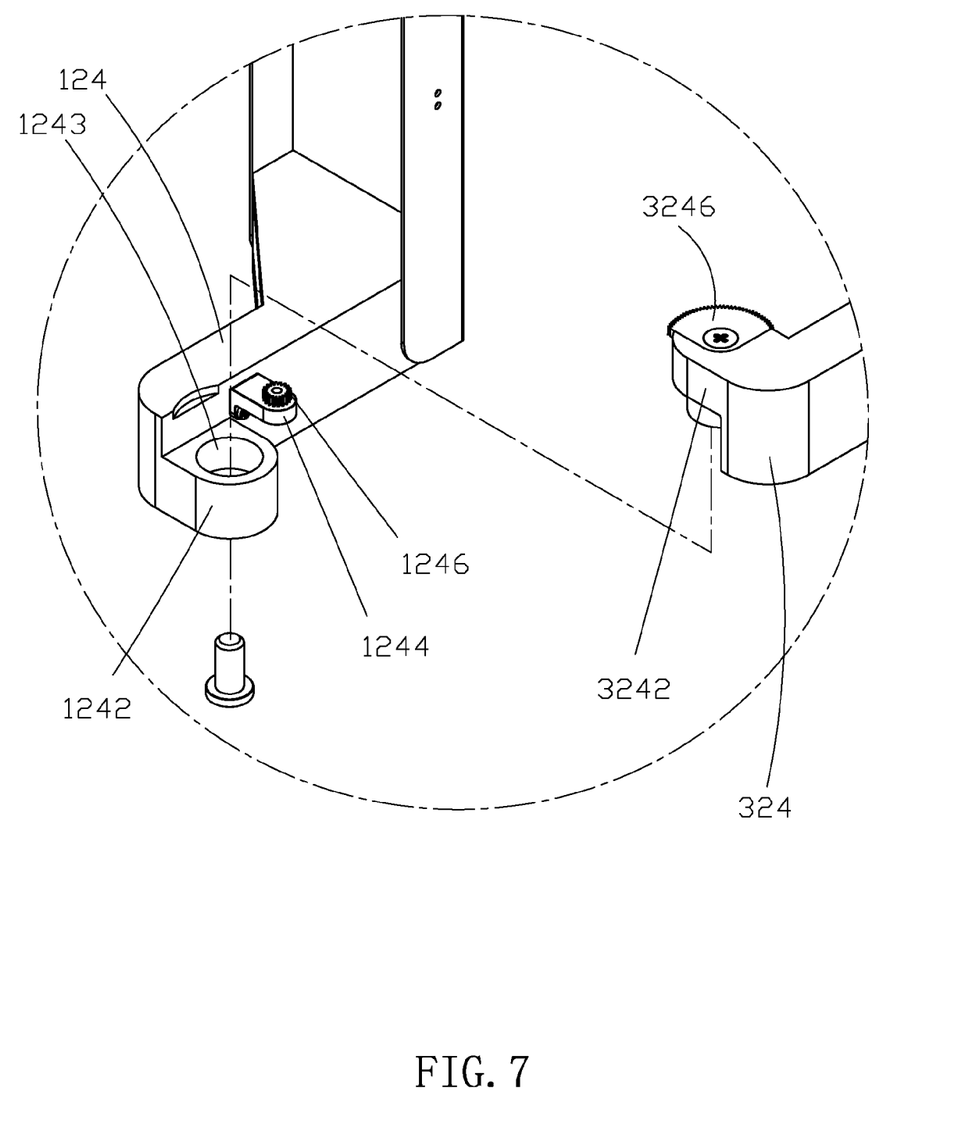
FIG. 7 is an enlarged view of a circle II in FIG. 5.
Figure 8:
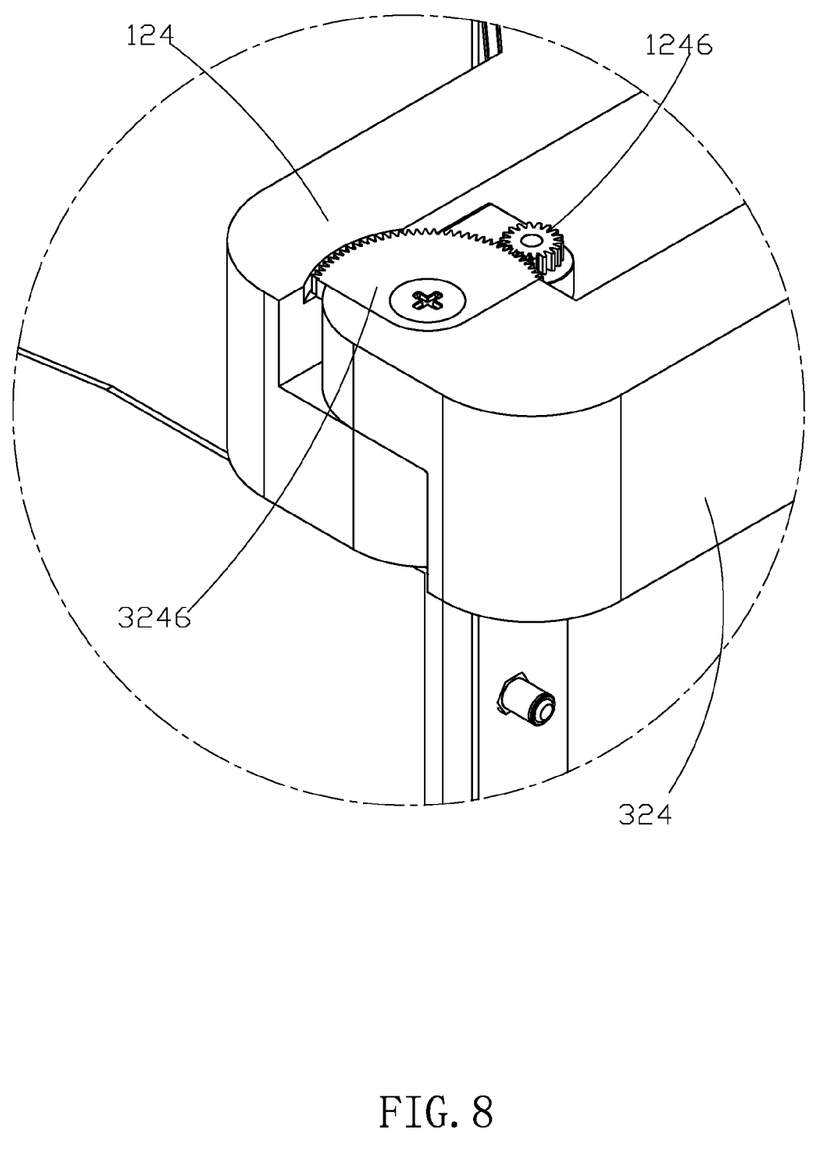
FIG. 8 is an enlarged view of a circle I in FIG. 1.

FIGS. 3 and 7 illustrate that the first fixing member 10 includes a first board 11 configured to fix one screen 60 (shown in FIG. 9) and a first supporting portion 12 fixed to a side of the first board 11. In at least one embodiment, the first board 11 is in a trapeziform shape, and forms a first recess portion 115. The first recess portion 115 is concaved apart from the screen 60 in the first board 11. The first recess portion 115 forms a first opening 1152 for heat-dissipation of the screen 60. A first bending portion 112 is located at an end of the first board 11. A plurality of first protrusions 114 protrude from a connection portion between the first bending portion 112 and the first board 11. The first supporting portion 12 includes a first connecting pillar 122. The first bending portion 112 is fixed on the side of the first connecting pillar 122. Two first connecting blocks 124 can be located at opposite ends of the first connecting pillar 122. In at least one embodiment, the first connecting block 124 is hollow and substantially L-shaped. An end of the connecting block 124 away from the first connecting pillar 122 defines a first coupling portion 1242 vertical to the connecting block 124. A middle of the coupling portion 1242 forms a hole 1243. An engaging portion 1244 is fixed on the first connecting block 124 closing the first coupling portion 1242, a first tooth 1246 protrudes from the engaging portion 1244.

Figure 4:
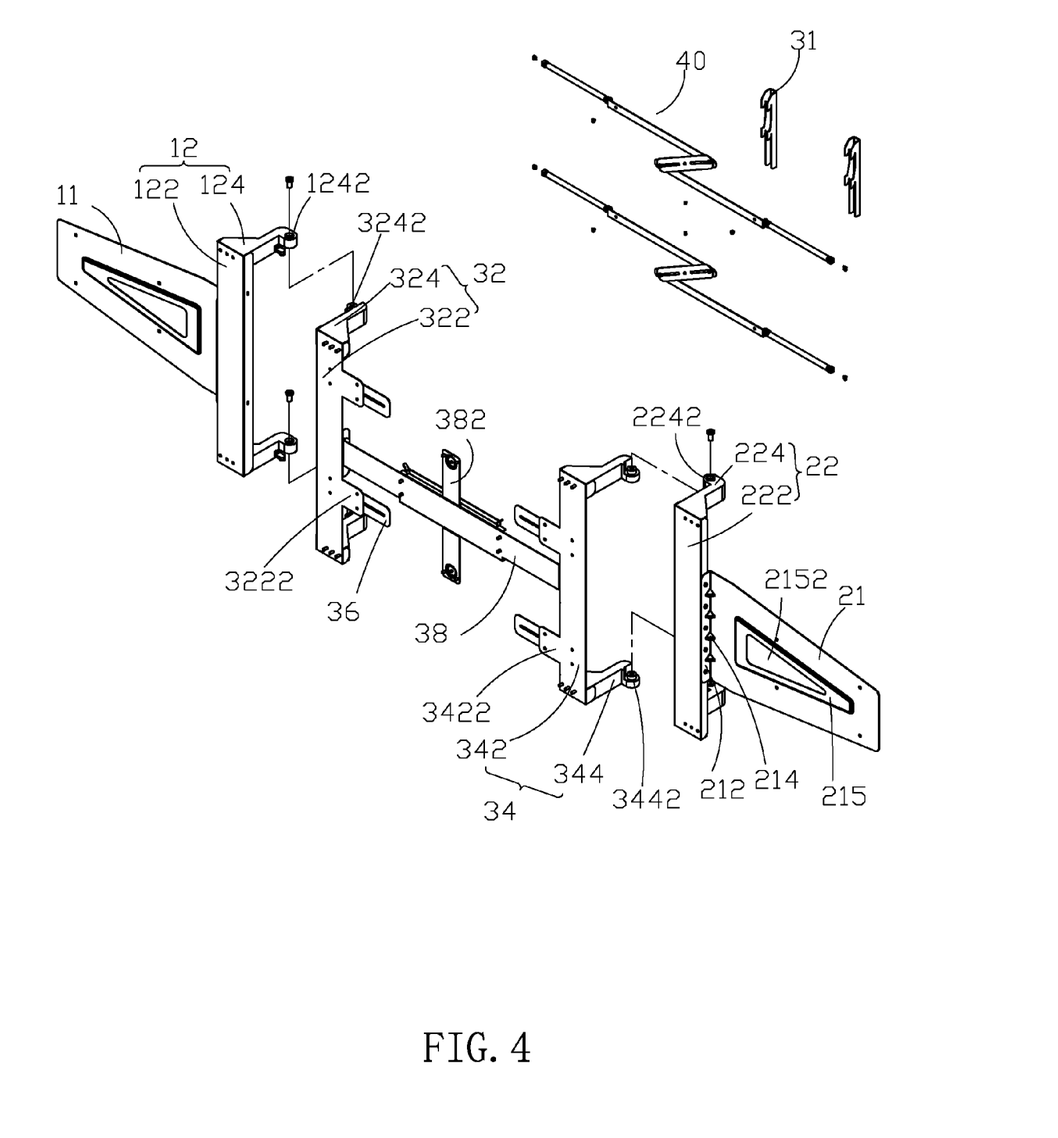
FIG. 4 is an exploded view of mounting device of FIG. 1.
Figure 5:
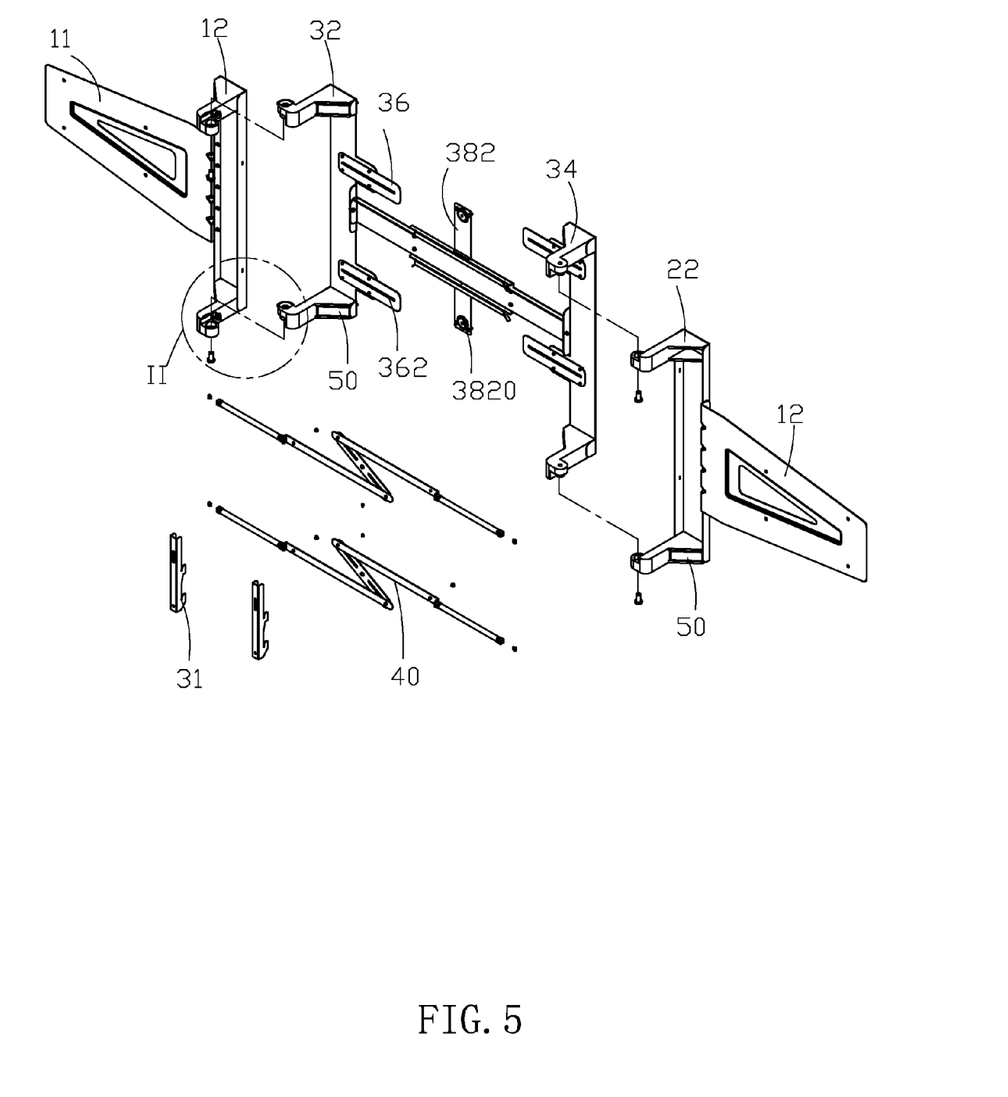
FIG. 5 is an exploded view of mounting device of FIG. 2.

FIGS. 4 and 5 illustrate that the second fixing member 20 includes a second board 21 and a second supporting portion 22 fixing the second board 21. In at least one embodiment, the first board 11 is in a trapeziform shape. The second recess portion 215 is concaved apart from the screen 60 in the second board 21. The second recess portion 215 forms a second opening 2152 for heat-dissipation of the screen 60. A second bending portion 212 is located at an end of the second board 21. A plurality of second protrusions 214 protrude from a connection portion between the second bending portion 212 and the second board 21. The second supporting portion 12 includes a second connecting pillar 222 and two second connecting blocks 224 fixed at opposite ends of the second connecting pillar 222. In at least one embodiment, the second connecting block 224 is hollow and substantially L-shaped. A reinforcement 50 is located at an inner of each of the first connecting blocks 124 and the second connecting blocks 224 strengthening the first connecting blocks 124 and the second connecting blocks 224. An end of the second connecting block 224 away from the second connecting pillar 222 defines a second coupling portion 2242 of which the shape is the same as the first coupling portion 1242.

FIGS. 1 and 2 illustrate that the third fixing member 30 includes a supporting shelf 31, a third supporting portion 32, a fourth supporting portion 34, a connecting sheet 36, and a coupling board 38. The third supporting portion 32 and the fourth supporting portion 34 are fixed at opposite ends of the coupling board 38 and vertical to the coupling board 38 respectively. The supporting shelf 31 is fixed on the middle of the coupling board 38 and configured to support one screen 60 (shown in FIG. 9). A plank 382 fixed on the coupling board 38 is vertical to the coupling board 38. Each of opposite ends of the plank 382 forms a protruding portion 3820 (shown in FIG. 5).

FIGS. 4-5 and 7 illustrate that the third supporting portion 32 includes a third connecting pillar 322 and two third connecting blocks 324 located at two ends of the third connecting pillar 322. Two first extending portions 3222 protruding from the third connecting pillar 322 are symmetrical to the coupling board 38. The third connecting block 324 is hollow and substantially L-shaped. A third coupling portion 3242 is located at an end of the third connecting block 324 away from the third connecting pillar 322. A second tooth 3246 fixed on the third coupling portion 3242 engages with the first tooth 1246.

The fourth supporting portion 34 includes a fourth connecting pillar 342 and two fourth connecting blocks 344 located on two ends of the fourth connecting pillar 342. Two second extending portions 3422 protruding from the fourth connecting pillar 342 are symmetrical to the coupling board 38. A shape of the second extending portion 3422 is the same as a shape of the first extending portion 3222. Each of the second extending portions 3422 and the first extending portions 3222 defines a connecting sheet 36 protruding from the second extending portion 3422 or the first extending portion 3222, each of the connecting sheets 36 forms a first groove 362. The fourth connecting block 344 is hollow and substantially L-shaped. A fourth coupling portion 3442 located at an end of the fourth connecting block 344 away from the fourth connecting pillar 34 is engaged with the second coupling portion 2242. A shape of the fourth coupling portion 3442 is the same as a shape of the third coupling portion 3242.

Figure 6:
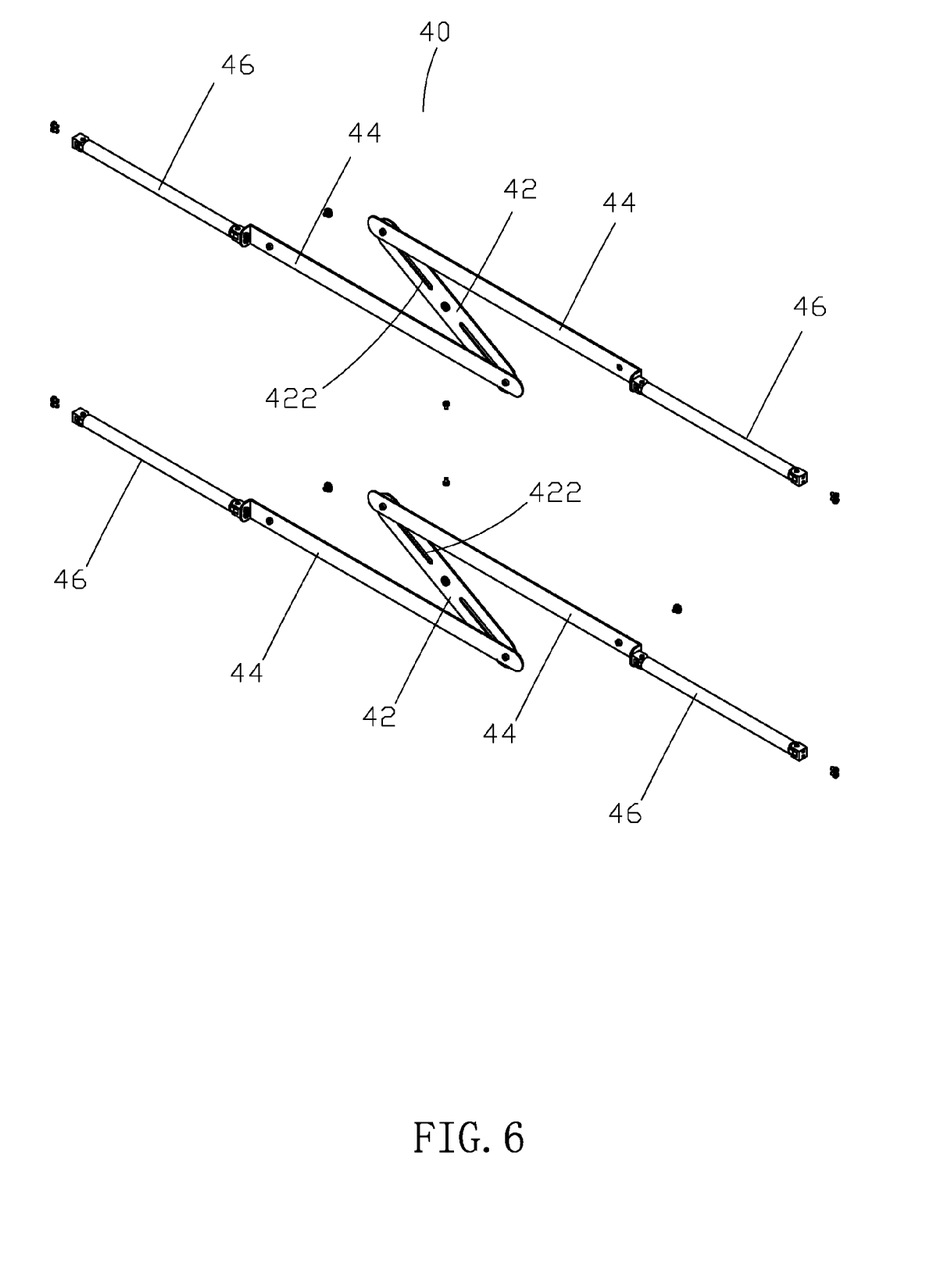
FIG. 6 an exploded view of a linking assembly in FIG. 1.

FIG. 6 illustrates that in this embodiment, there is two linking assemblies 40. Each of the linking assemblies 40 includes a first part 42, two second parts 44, and two third parts 46. A shape of the first part 42 is mainly a quadrate. Two second grooves 422 located at the two ends of the first part 42. An end of each of two second parts 44 is fixed in the second groove 422 of the first part 42 and capable of rotating relative to the first part 42, and the other end pivots to the an end of the third part 46. An end of the third part 46 away from the second part 44 pivots to the first connecting pillar 122 or the second connecting pillar 222 (refer to FIG. 1).

In assembly, the first fixing member 10 is combined with the third fixing member 30 via the first coupling portion 1242 encircling the third coupling portion 3242, and the first tooth 1246 engages with the second tooth 3246. The second fixing member 20 is combined with the third fixing member 30 via the second coupling portion 2242 encircling the fourth coupling portion 3442. Thus, the first setting 10 and the second setting 20 pivot to opposite ends of the third setting 30 respectively. The first part 42 of the linking assembly 40 is fixed on the protruding portion 3820 of the plank 382 and able to rotate relative to the protruding portion 3820. An end of the third part 46 of the linking assembly 40 pivots to the first connecting pillar 122 or the second connecting pillar 222. An end of the second part 44 away from the first part 42 is movably fixed in the first groove 362 of the connecting sheet 36. The linking assembly 40 is fixed relative to the first setting 10, the second setting 20, and the third setting 30. The assembly is complete.

Figure 10:
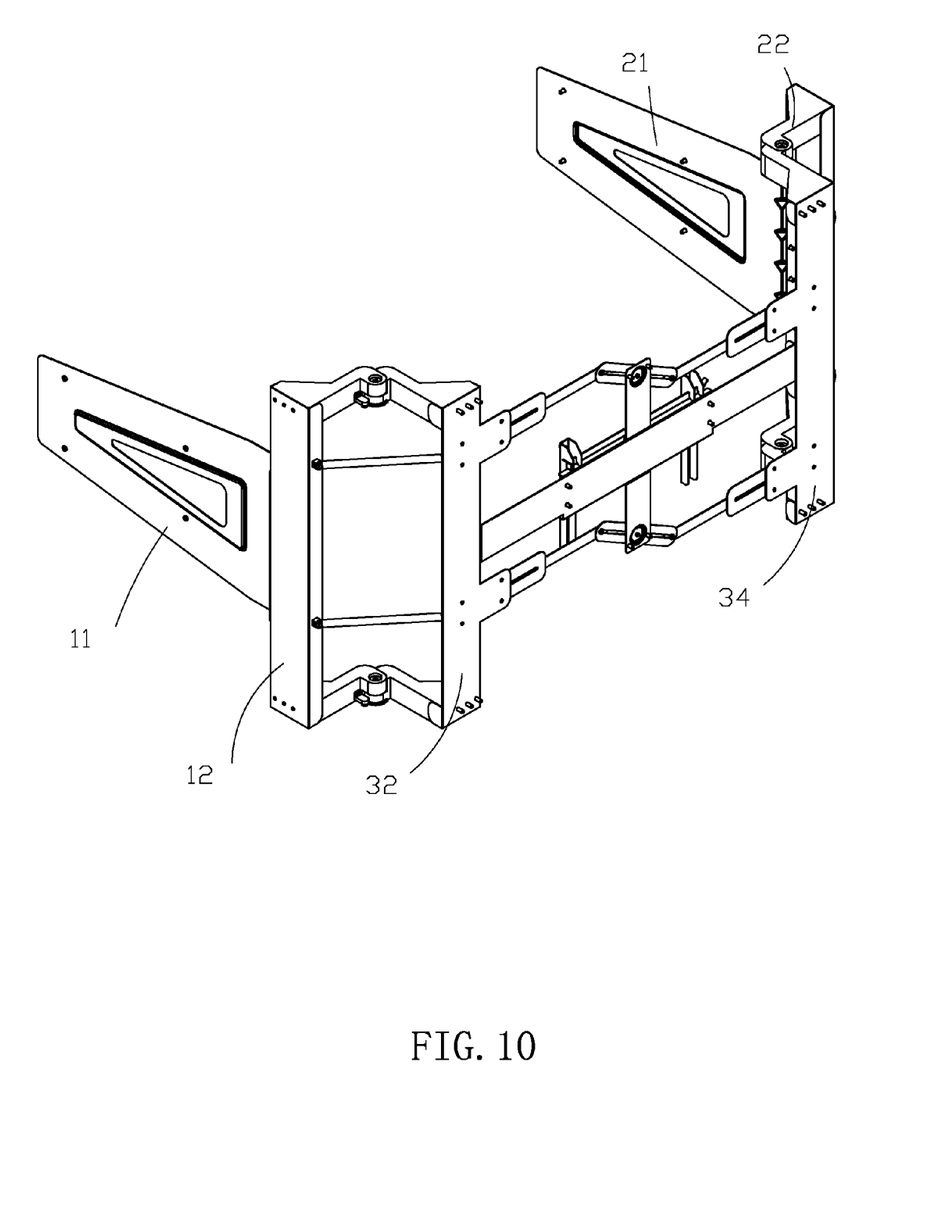
FIG. 10 is an isometric view of the mounting device of FIG. 1 in a second state.

When the first fixing member 10 is rotated, the third part 46 of the linking assembly 40 connecting with the first fixing member 10 rotates relative to the first fixing member 10 to drive the third part 46 of the linking assembly 40 to connecting with the second fixing member 20 to rotate the second fixing member 20. When the second fixing member 20 is rotated, the first fixing member 10 also rotates along with the second fixing member 20 (shown in FIGS. 9 and 10).

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A mounting device for multiple screens, comprising:
   a first fixing member;
   a second fixing member; and
   a third fixing member fixed on an object, opposite ends of the third fixing member pivoted to the first fixing member and the second fixing member;
   a linking assembly fixed on the third fixing member, wherein a first end of the linking assembly is fixed on the first fixing member, and a second end of the linking assembly is fixed on the second fixing member, when the first fixing member is rotated, the second fixing member is rotated relative to the third fixing member via the linking assembly, when the second fixing member is rotated, the first fixing member is rotated relative to the third fixing member via the linking assembly, wherein the linking assembly comprises a first part, two second parts fixed rotatably at two ends of the first part, and two third parts pivoted, a first end of each of the third parts is connected with the second part, and a second end of each of the third parts is connected with the first fixing member or the second fixing member,
   wherein the screens are held by the first fixing member, the second fixing member, and the third fixing member; the first fixing member and the second fixing member are rotated with respect to the third fixing member at a same time; and
   wherein the first fixing member comprises a first board forming a first plane, the second fixing member comprises a second board forming a second plane, the first plane and the second plane relative to the third fixing member forms a continuous change of angle when rotated.

2. The mounting device of claim 1, wherein a plurality of connecting sheets are located at the third fixing member, each of the connecting sheets defines a first groove to receive the second part, the second part is capable of sliding in the first groove.

3. The mounting device of claim 2, wherein two second grooves are defined in opposite ends of the first part, the second parts are received in the second grooves, the second parts are capable of rotating relative to the first part.

4. The mounting device of claim 3, wherein the first fixing member comprises a first supporting portion forming a first coupling portion, the second fixing member comprises a second supporting portion forming a second coupling portion, the third fixing member comprises a third supporting portion forming a third coupling portion and a fourth supporting portion forming a fourth coupling portion, the first coupling portion is pivoted to the third coupling portion, the second coupling portion is pivoted to the fourth coupling portion.

5. The mounting device of claim 4, wherein a coupling board is coupled between the third supporting portion and the fourth supporting portion, a plank is located at the coupling board to fix the first part of the linking assembly.

6. The mounting device of claim 1, wherein the first fixing member comprises first tooth, the third fixing member comprises second tooth engaging to the first tooth.

7. A mounting device for multiple screens, comprising:
a first fixing member;
a second fixing member;
a third fixing member with opposite ends being pivoted to the first fixing member and the second fixing member; and
a linking assembly fixed on the third fixing member, wherein a first end of the linking assembly is fixed on the first fixing member, and a second end of the linking assembly is fixed on the second fixing member, when the first fixing member is rotated, the second fixing member is rotated relative to the third fixing member via the linking assembly, when the second fixing member is rotated, the first fixing member is rotated relative to the third fixing member via the linking assembly, wherein the linking assembly comprises a first part, two second parts fixed rotatably at two ends of the first part, and two third parts pivoted, one end of each of the third parts is connected with the second part, and other end is connected with the first fixing member or the second fixing member,
wherein the screens are mounted on the first fixing member, the second fixing member, and the third fixing member; when the first fixing member is rotated with respect to the third fixing member, the second fixing member is simultaneously driven by the first fixing member to rotate with respect to the third fixing member; and
wherein the first fixing member comprises a first board forming a first plane, the second fixing member comprises a second board forming a second plane, the first plane and the second plane relative to the third fixing member forms a continuous change of angle when rotated.

8. The mounting device of claim 7, wherein a plurality of connecting sheets are located at the third fixing member, each of the connecting sheets defines a first groove to receive the second part, the second part is capable of sliding in the first groove.

9. The mounting device of claim 8, wherein two second grooves are defined in opposite ends of the first part, the second parts are received in the second grooves, the second parts are capable of rotating relative to the first part.

10. The mounting device of claim 9, wherein the first fixing member comprises a first supporting portion forming a first coupling portion, the second fixing member comprises a second supporting portion forming a second coupling portion, the third fixing member comprises a third supporting portion forming a third coupling portion and a fourth supporting portion forming a fourth coupling portion, the first coupling portion is pivoted to the third coupling portion, the second coupling portion is pivoted to the fourth coupling portion.

11. The mounting device of claim 10, wherein a coupling board is coupled between third supporting portion and the fourth supporting portion, a plank is located at the coupling board to fix the first part of the linking assembly.

12. The mounting device of claim 7, wherein the first fixing member comprises first tooth, the third fixing member comprises second tooth engaging to the first tooth.

13. A mounting device for multiple screens comprising:
a third fixing member fixed on an object and having a first end pivotally coupled to a first fixing member and a second end, opposite to the first end, pivotally coupled to a second fixing member;
the first, second and third fixing members are configured to have the multiple screens mounted thereto; and
the first and second fixing members are configured to be rotated with respect to the third fixing member at a same time; and a linking assembly fixed on the third fixing member, wherein a first end of the linking assembly is fixed on the first fixing member, and a second end of the linking assembly is fixed on the second fixing member, when the first fixing member is rotated, the second fixing member is rotated relative to the third fixing member via the linking assembly, when the second fixing member is rotated, the first fixing member is rotated relative to the third fixing member via the linking assembly, wherein the linking assembly comprises a first part, two second parts fixed rotatably at two ends of the first part, and two third parts pivoted, one end of each of the third parts is connected with the second part, and other end is connected with the first fixing member or the second fixing member,
wherein the first fixing member comprises a first board forming a first plane, the second fixing member comprises a second board forming a second plane, the first plane and the second plane relative to the third fixing member forms a continuous change of angle when rotated.

14. The mounting device of claim 13, wherein a plurality of connecting sheets are located at the third fixing member, each of the connecting sheets defines a first groove to receive the second part, the second part is capable of sliding in the first groove.

* * * * *